United States Patent [19]
Hoffmann

[11] Patent Number: 5,102,545
[45] Date of Patent: Apr. 7, 1992

[54] TUBULAR FILTER ELEMENT

[75] Inventor: Jürgen Hoffmann, Hardegsen-Ellierode, Fed. Rep. of Germany

[73] Assignee: Sartorius AG, Göttingen, Fed. Rep. of Germany

[21] Appl. No.: 526,756

[22] Filed: May 22, 1990

[30] Foreign Application Priority Data

May 23, 1989 [DE] Fed. Rep. of Germany ....... 3916744

[51] Int. Cl.$^5$ .................... B01D 27/06; B01D 27/08
[52] U.S. Cl. .................... 210/438; 210/484; 210/487; 210/493.1; 210/497.2; 55/498; 55/500; 55/521
[58] Field of Search .................... 210/321.77, 321.86, 210/321.78, 321.87, 438, 439, 440, 443, 452, 433.1, 493.1, 493.2, 493.5, 458, 484, 485, 487, 489; 55/498, 500, 521

[56] References Cited

U.S. PATENT DOCUMENTS

| | | | |
|---|---|---|---|
| 2,886,180 | 5/1959 | Morgan et al. | 210/438 |
| 3,256,989 | 6/1966 | Hultgren | 210/438 |
| 3,724,665 | 4/1973 | Hall | 210/438 |
| 4,244,820 | 1/1981 | Hauk et al. | 210/194 |

FOREIGN PATENT DOCUMENTS 1468560 11/1986 U.S.S.R. .................... 210/321.86

Primary Examiner—Robert A. Dawson
Assistant Examiner—Wanda L. Millard
Attorney, Agent, or Firm—Eric P. Schellin

[57] ABSTRACT

A tubular filter element consisting of a filter leaf which is pleated and connected at both its fold ends to a hollow cylindrical filter body (F) both of whose front surfaces are sealed by end caps (11, 13), one end cap (13) of which opens, as a connection cap, the hollow core (10') for communication with a housing space (3) of a surrounding housing, the force flow guidance of the fluid to be treated takes place along the folds (10) through a tube (6', 5) which extends through the hollow core (10') of the filter body (F), rests on the fold edges of the filter body (F), is open at one end in the area of the fold range functioning as outlet or inlet (20), is tapered in the area of the fold range functioning as inlet or outlet (21) and forms a connection (5) for the recirculating flow of fluid coaxially to the connection cap (3) for the flow of fluid to be treated which cap establishes the housing communication.

5 Claims, 2 Drawing Sheets

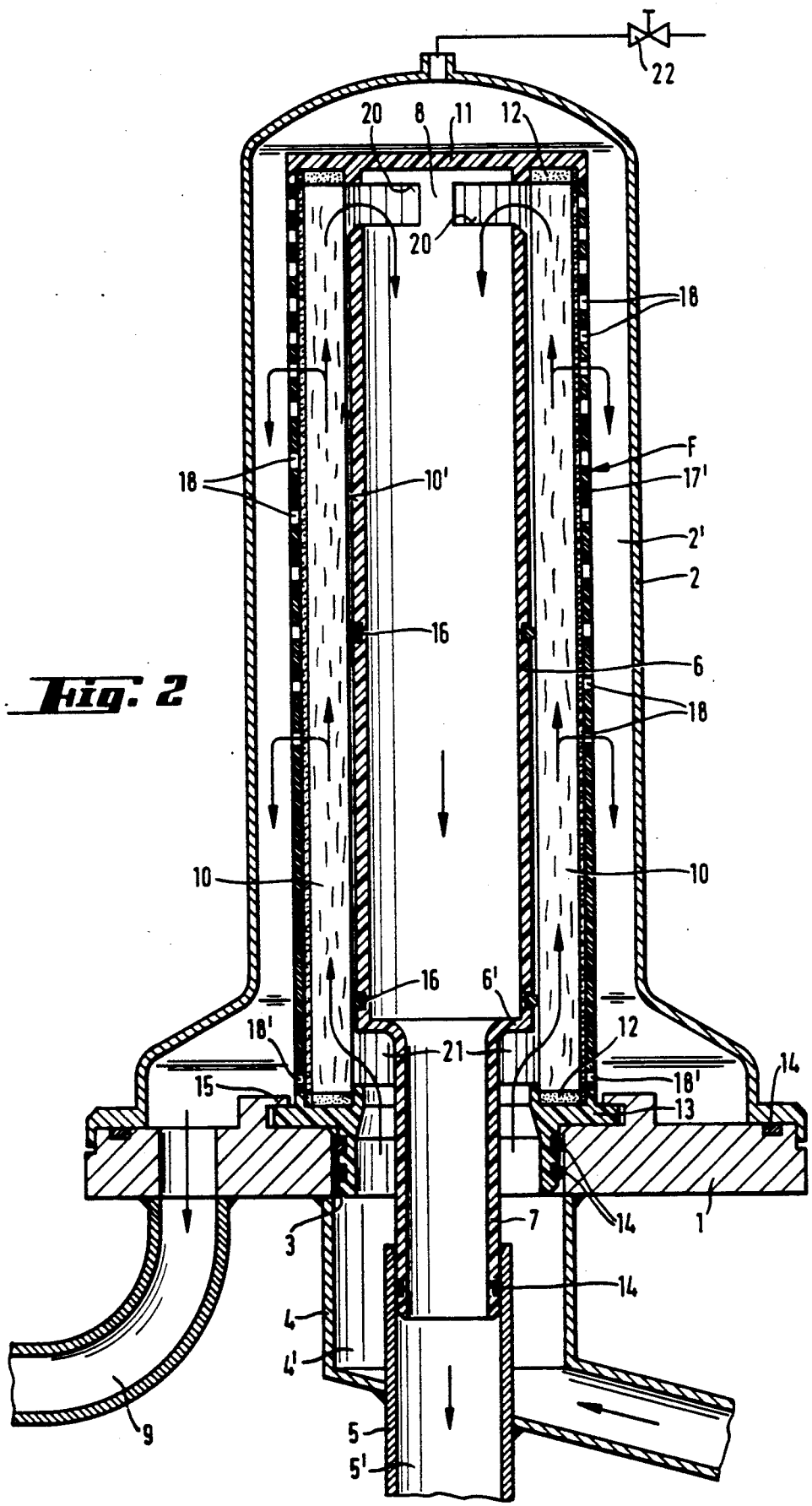

TUBULAR FILTER ELEMENT

BACKGROUND OF THE INVENTION invention relates to a tubular filter element consisting of at least one filter leaf which is pleated in parallel folds and connected at both its fold ends to a hollow cylindrical filter body both of whose front surfaces are surrounded in a sealing manner by end caps, at least one end cap of which opens the hollow core for communication with a housing space of a surrounding housing and in which the fluid to be treated is guided in flow paths along the filter leaf in a forced, recirculating manner between an inlet into the folds at one tube end and an outlet at the other tube end as retentate and in which the permeate can be removed from a second or another housing space.

A comparable filter element is known e.g. from U.S. Pat. No. 4,244,820. In this known design a membrane exhibiting filter properties, a support layer which drains this membrane and a basically fluid-impermeable web are pleated in folds lying on top of each other, connected at their fold ends to a hollow cylinder and surrounded by end caps.

The basically fluid-impermeable web is designed thereby so that it is shortened at both tube ends like a sleeve so that the draining support layer exhibits no fluid-tight web at both ends and is thus open and a forced guidance of liquid in these folds is possible. It is necessary however, that the peripheral fold openings covered by the web are closed by an additional sealing unit in the depth of the pleating and that this sealing unit also seals the tube body relative to a surrounding housing. The manufacturing expense and constructive expense as regards the flow guidance in the housing is considerable. The use of such a construction therefore occurs in relatively small-format filter units in which the housing is usually part of a disposable unit.

In the known design described above, an irreversible blocking of the filter element during the filtration of fluids which are heavily loaded with colloids should be prevented by means of recirculating overflow. In the case of filter elements with a plate design, the overflowing of the filter areas in a cross-flow operation has proven itself, since the undesirable cover-layer design of the filter can be largely avoided during the filtration process in that the medium flows over the filter area at a high speed with the inclusion of baffles which generate turbulence, which delays a cover-layer formation during the filtration procedure. The overflow speed, slot height, slot geometry, filter interactions and other factors are decisive influencing values for this.

A recirculating overflow of such filter areas also has the advantage that the medium to be treated always remains in motion and in equilibrium, even if no filtrate is removed at times in the process at the point of removal.

If, on the other hand, there is no recirculation, standstill times at various contact points result by means of the adjustment of various chemical equilibria in a different composition or further a microbic contamination, sedimentation, etc. For these reasons, an overflow in the sense of a recirculation offers advantages for the adjustment of a permanent equilibrium.

The component to be removed at the surface of the separation element becomes poor in the performance of pervaporation processes without recirculation too. This reduces the separation performance. In contrast thereto, a permanent overflow in the narrow slot in the case of a suitable overflow speed prevents the concentration polarization on the surface of the separation element.

If a filter is blocked or if the surface is no longer effective due to the formation of fouling or if the effective surface component is exhausted, then the attempt is made for economic reasons to clean or regenerate it. This is possible in an optimum fashion by means of a controlled overflow of the entire area with specific regeneration media and cleaning media which exhibit a chemical and/or physical action. Contact times, concentrations, etc. can be controlled. In the case of chromatographic processes, the overflow also assures that a complete elution is possible.

Due to the complicated flow guidance and the associated manufacturing expense as well as the construction expense for the housing design with low variability of the total system, the initially mentioned, tubular filter elements with forced overflow according to U.S. Pat. No. 4,244,820 have not gained acceptance, not even for the areas of application cited in the specification.

The invention therefore has the problem of further developing a separation and/or filter element of the initially mentioned, large-area type with simple constructive means in such a manner that, in addition to a simplified design and relative to diverse applications and improved variability, a simplified manipulation upon its inclusion into a surrounding housing and a simplified flow guidance are also present.

SUMMARY OF THE INVENTION

The invention solves this problem by means of the features indicated hereinafter.

It is possible by means of the design of the filter element itself in accordance with the invention to insert relatively large-format filter elements into reusable housing of plastic or fine steel. These filter elements are easy to replace and manipulate and test, e.g. for integrity. The constructive design of the filter elements has the result that all connections of the housing can be place in a housing base and an upper housing part which surrounds the filter element can be designed without connections which impede manipulation. It is also possible by means of the design of the filter element of the invention to locate it in a readily replaceable manner in a housing provided with multiple filter elements. A housing designed to this end also comprises all individual connections for the filter elements, collection areas for these individual connections and the two necessary main connections for retentate supply, retentate removal and permeate removal in a housing base.

The concept of the invention will be explained in two exemplary embodiments with reference made to the attached drawings.

BRIEF DESCRIPTION OF THE DRAWINGS

FIG. 2 shows a second embodiment in a corresponding view.

DETAILED DESCRIPTION OF THE DRAWINGS

Figure 1:
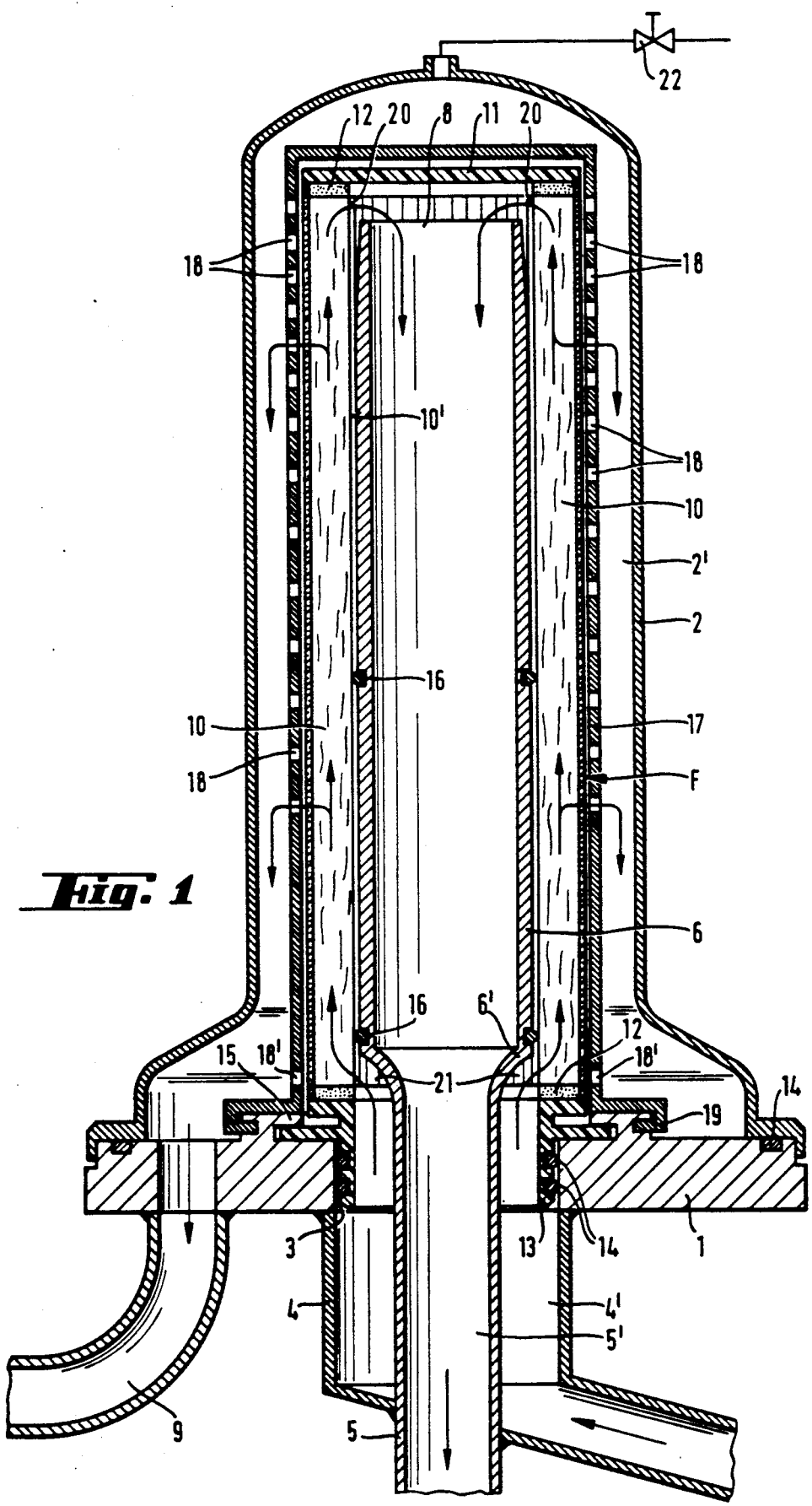
FIG. 1 shows a vertical section through a first embodiment of filter elements and housing.

The housing 1, 2, e.g. of fine steel, which receives filter element F consists of lower housing part 1 with support feet (not shown), with a housing opening 3 receiving connection cap 13 of filter element F, which opening merges into connection piece 4 for the supply of the fluid to be treated, and with connection piece 5 which extends coaxially through this housing opening 3 and changes into a shoulder 6' and into a tube 6 adapted to the length of filter element F. This tube 5, 6', 6 serves for the return guidance of the retentate. In addition, lower housing part 1 comprises connection 9 for permeate removal from housing areas 2'.

As a deviation from the above, in the embodiment according to FIG. 2, tube 5 with its housing area 5' as a part of the housing ends underneath housing opening 3. Tube 6 with shoulder 6' and tapered tube end 7 for the return guidance of the retentate is a part of filter element F.

Filter element F according to FIG. 1 consists of a single-layer or multi-layer, designed according to principles of necessary separation properties, filter leaf consisting of optionally modified deep filter media, membrane filters, non-porous filter webs draining support layers in the form of lattices, fleeces, perforated and stamped webs in very different combinations for fine filtration, microfiltration, ultrafiltration, chromatography or pervaporation. The single-layer of multi-layer filter leaf is pleated in a plurality of folds 10 and the fold ends are sealingly connected at their longitudinal edges to a hollow cylindrical filter elements like that known in the state of the art.

The front areas of filter element F are connected in a leadproof manner via sealing mass 12 to the two end caps 11, 13, whereby end can 11 is closed and end cap 13 is designed as an open connection cap and comprises a connection piece on its outside with O-ring seals 14 and locking noses which function to lock filter element F on lower housing part 1 with locking elements 15 located on this part.

Tube 6 for returning the retentate rests tightly on inner hollow core 10' formed by the filter unit. The sealing position can be supported in the case of pleated filter media e.g. by means of several O-rings distributed over its length, which rings form only flow baffles so that no preferred short-circuit paths can arise. Tube 6 ends in the upper area somewhat below upper end cap 11 so that in this area, folds 10 form an outlet 20 between end cap and tube which outlet corresponds to open tube end 8. In the lower area tube 6 with a shoulder 6' changes into tapered tube 5 or connection somewhat above lower sealing means 12. This forms an annular space for the supply of the retentate from chamber 4' in the area of connection cap 13, the cross-sectional area of which annular space is adapted to the cross-sectional area of tapered tube 5 and of retentate chamber 5' for the return of the retentate. If the supply of the fluid to be treated generally occurs through chamber 4' and the return through chamber 5', the cross-sectional area of chamber 5' can also be reduced adapted to the filtrate performance.

In the embodiment according to FIG. 1, filter element F is surrounded on this outside by a hat-shaped, perforated tube 17 which also comprises locking means 19 on its lower end which grasp behind locking means 15 of the housing. Perforations 18 are purposefully arranged in such a manner in the flow approach range for the obtention of a backpressure effect that they increase from below toward the top in their cross-sectional area in order to generate a controlled filtrate flow. Several small perforations 18' are located only at the lowest point in order to empty the dead volume on the filtrate side.

Thus, the fluid to be treated flows through chamber 4', enters into the fold openings at 21, flows through the folds in an axial direction, exits from the fold openings at 20, into opening 8 of tube 6, 6', 5 and leaves the latter as concentrated medium and reenters chamber 4' in a recirculating manner.

In this embodiment only the actual filter element F is to be considered as expendable material whereas tube 6 for the return of the retentate is a component of housing 1, 2 and perforated tube 17' is multiply available to the user as a reusable part, e.g. of plastic, or can be replaced by another variant by the manufacturer or the user, depending on the application.

In a divergent manner, in the embodiment of FIG. 2, tube 6 with shoulder 6' and lower tube end 7 is a component of the acutal filter element F. Perforated tube 17' is again designed to suit the application but engages in an integrated manner into both end caps 11, 12.

There is, however a functional coincidence with the embodiment of FIG. 1. Of course, both embodiments can be combined as desired as concerns tube 6 and tube 17.

The filter elements of the invention can also be housed according to the same design principle presented here in accordance with FIGS. 1, 2 in a plurality in a housing with a plurality of apertures 3. It is necessary for this that all apertures 3 empty into a common first chamber with a main connection for the supply of the fluid to be treated and that tubes 5 empty as far as into a further housing chamber located thereunder with a main connection for retentate removal so that a total of at least three main connections are provided in the lower housing part, namely, for the supply of the fluid to be treated, retentate removal and permeate removal. It can, however, be advantageous for certain applications if the filter elements can receive the flow individually or can be blocked off individually.

Both embodiments according to FIGS. 1 and 2 have the advantage that as a result of the coaxial arrangement, leaks between retentate chamber 4' and 5' are harmless and only an absolute seal against leaks must be assured in the area of connection cap 13 with O-rings 14 between retentate area 4' and permeate area 2'.

The filter element preferably receives the flow via fluid chamber 4'. A reversal of flow via fluid chamber 5' is also possible.

As a result of these simple constructive measures, the flow passes over e.g. the large, freely accessible filter areas formed by pleatings in recirculation operation, whereby it is assured that the entire filter area is covered, conditioned by the pressure relationships and the radial relationships, that is, by the direction of filtration and the increase of the free volume between the pleated folds and the radius. This can considerably increase retention times and filtration performances and in the case of standstill times, i.e. no removal of filtrate, e.g. a local microbic contamination or of the changes of the medium resulting from the standstill of the medium can be avoided.

Filter elements of the type described can be used with advantage for numerous applications in the areas of pharmacy, biotechnology, food technology, semiconductor technology, environmental technology, the chemical industry and in other areas.

A few embodiments are explained in the following:

EXAMPLE 1

In a filter element of the described type for pervaporation, the pleated filter unit consists of a fluid-selective foil standing in direct contact on the overflow side with the fluid to be treated. It is supported on the filtrate side by one or more relatively open, draining fabrics of fleeces. External tube 17 is designed to be very open in this instance. The condensation of the permeate can be supported by cooling the housing, at whose permeate exit 9 a vacuum is present. The overflow assures that the substance on the surface to be removed possesses an undiminished separation performance and e.g. the surface can be specifically purified.

EXAMPLE 2

In a modified filter element of the described type for the semiconductor industry the pleated filter unit which the flow passes over consists of a microfilter supported on both sides by draining fleeces and fabric. This filter unit is outwardly surrounded by another pleated cylinder. Both pleated cylinders are sealed in a leakproof manner at end caps 11, 13. The intermediary space between both pleated cylinders can be regulated with compressed gas or degassed, optionally through a connection in end cap 11. The outer pleated cylinder is designed analogously to the inner pleated cylinder but can contain finer microfilters or also ultrafilters, depending on the filtration purpose. The entire filter unit including the housing can be constructed of inert plastic. Water with the specific resistance of 18M cm, for example, is filtered, which is required at the point of use for rinsing wafers and must be filtered in advance once again to be extremely particle-free and bacteria-free. The overflow assures that if the filtrate is not removed, the retentate side does not become contaminated with microbes (UV light in the circuit) or the conductivity of the water change (chemical equilibrium). On the other hand, this filter element permits a removal or blockage of filtrate at the point of use without a valve having to be opened behind the last membrane or filter-active layer. The latter frequently give off particles. If the filtrate removal is to be interrupted, the intermediary space between the pleated cylinders is preferably controlled with a pure, inert compressed gas. Once the pressure of the overflow side has been achieved, then the filtration is stopped and the entire liquid from the intermediary space between the pleated cylinders is pressed into the filtrate space. If filtrate is required again, then the intermediary space is slowly brought to normal pressure. The filtration via the first pleated cylinder begins without pulsations and any giving off of particles possibly associated therewith occurring at the second pleated cylinder.

EXAMPLE 3

In a filter element of the described type for the pharmaceutical industry, the pleated filter unit consists of one or two ultrafilters, one of which stands in direct contact on the overflow side with the fluid which was previously filtered sterile by microfiltration. The ultrafilter or ultrafilters are supported on the filtrate side by a fabric, fleece of a perforated, stamped web. An overflow is necessary in order to prevent a surface polarization, that is, a concentration and possible breakthrough of the pyrogens on and through the very thin active layer of the ultrafiltration membranes.

EXAMPLE 4

In the case of a filter element of the described type for environmental technology, example 1 can be referred to if, for example, the removal of halogenated hydrocarbons, phenols or poisonous polymer monometers is involved. Example 5 can be used as regards e.g. the dentrification of water. Various specific embodiments can be realized according to the problem posed to the extend that an overflowing of the fluid to be treated or of auxillary media is advantageous or necessary.

EXAMPLE 5

The filter element of the described type for chromatography methods comprises a filter unit in which microfilters and/or ultrafilters or also deep filters are integrated which are modified in such a manner that the medium to be surface of the filter unit and passes through the filter unit proportionally, according to the pressure on the filtrate side, so that the entire active surface becomes active. The fact that the filter unit can be flowed through also offers considerable advantages in elution and regeneration, which can be regulated in both directions and in overflow.

EXAMPLE 6

In a filter element of the described type for biotechnology, a pleating, for example, with an ultrafilter or microfilter which is protected on both sides or on one side by drainage layers if flowed over on the inside in a permanent fashion by fermenter contents.

Filtering occurs or does not occur in the housing as a function of the gas pressure. Thus, specimens can be taken or filtrate removed as required. On the other hand, gas can be brought into the fermenter liquor in a defined manner according to the bubble point of the membrane, e.g. by using a hydrophobic microfilter membrane or in the case of hyrophilic membranes if the differential pressure in the housing to the overflow pressure is e.g. just under the bubble point. If hydrophilic membranes are used, media can be dosed into the overflowing fermenter contents in a defined and sterile filtered manner by flooding the housing and regulating the differential pressure. The filtering is then performed from the outside toward the inside.

I claim:

1. A filter device for use in a recyclable fluid filtration system comprising an elongated longitudinally spaced pleated cylindrical tubular filter, said filter having a first end and a second end, an open-ended tube being concentric and internal said filter, said open-ended tube having terminus proximate the first end of said filter, said open-ended tube having a portion extending from said filter beyond the second end, said first end of the filter being closed with closure means whereby a closed flow path is defined from spaces between the pleats of the filter to the terminus of said open-ended tube, said closure means having a longitudinally extending perforated cylindrical tube concentric with said filter having a terminus proximate the said second end of the said filter, a cap means closing off said perforated cylindrical tube and in abutment with said second and of said filter, said cap means having a central through bore through which said portion of said open-ended tube axially extends and said bore having a diameter whereby providing an annular space about the portion of the tube extending through the bore thereby defining a fluid flow path to provide to-be-filtered fluid under pressure to flow longitudinally in the spaces of the pleats of the said filter, said filter device having housing means concentric and spaced from said perforated tube, said housing means having port means for removing filtered fluid passing through said filter.

2. The filter device of claim 1 wherein said open-ended tube is of a larger diameter than the portion extending from said filter.

3. The filter device of claim 2 wherein the said open-ended tube of larger diameter and the portion extending from said filter is connected by a tapering portion.

4. The filter device of claim 3 wherein said port means for the filtered fluid is in the said cap means.

5. The filter device of claim 4 wherein the cap means has a tubular connector conduit means secured in said bore and said second end of said filter is abuttingly attached thereto.

* * * * *